United States Patent
Hegge et al.

(10) Patent No.: US 11,573,340 B2
(45) Date of Patent: *Feb. 7, 2023

(54) RECONFIGURABLE SEISMIC SENSOR CABLE

(71) Applicant: PGS Geophysical AS, Oslo (NO)

(72) Inventors: Robertus Franciscus Hegge, Rijswijk (NL); Roald G. Van Borselen, Voorschoten (NL)

(73) Assignee: PGS Geophysical AS, Oslo (NO)

( * ) Notice: Subject to any disclaimer, the term of this patent is extended or adjusted under 35 U.S.C. 154(b) by 419 days.

This patent is subject to a terminal disclaimer.

(21) Appl. No.: 16/809,326

(22) Filed: Mar. 4, 2020

(65) Prior Publication Data

US 2020/0200927 A1 Jun. 25, 2020

Related U.S. Application Data

(63) Continuation of application No. 14/339,283, filed on Jul. 23, 2014, now Pat. No. 10,591,622.

(60) Provisional application No. 61/897,510, filed on Oct. 30, 2013.

(51) Int. Cl.
*G01V 1/00* (2006.01)
*G01V 1/16* (2006.01)
*G01V 1/20* (2006.01)
*G01V 1/38* (2006.01)

(52) U.S. Cl.
CPC .......... *G01V 1/16* (2013.01); *G01V 1/201* (2013.01); *G01V 1/38* (2013.01)

(58) Field of Classification Search
USPC .......................................................... 367/154
See application file for complete search history.

(56) References Cited

U.S. PATENT DOCUMENTS

| | | | |
|---|---|---|---|
| 4,078,223 | A | 3/1978 | Strange |
| 4,547,869 | A | 10/1985 | Savit |
| 5,774,416 | A | 6/1998 | Sadek et al. |
| 6,128,251 | A | 10/2000 | Erath et al. |
| 6,271,621 | B1 | 8/2001 | Ito |
| 6,274,863 | B1 | 8/2001 | Kersey |
| 6,314,056 | B1 | 11/2001 | Bunn et al. |
| 6,657,365 | B1 | 12/2003 | Ambs |
| 6,850,461 | B2 | 2/2005 | Maas et al. |
| 6,853,604 | B2 | 2/2005 | Spackman et al. |
| 7,379,386 | B2 | 5/2008 | Muyzert et al. |

(Continued)

FOREIGN PATENT DOCUMENTS

| | | |
|---|---|---|
| GB | 2461418 | 1/2010 |
| GB | 2481520 | 12/2011 |
| GB | 2493838 | 2/2013 |

OTHER PUBLICATIONS

Malaysian Substantive Examination Report for Application No. PI 2014703173 dated Jul. 29, 2020.

(Continued)

*Primary Examiner* — James R Hulka

(57) ABSTRACT

Embodiments relate to a sensor cable that may be reconfigurable to have various combinations of seismic sensors. An apparatus may comprise a sensor cable and seismic sensors distributed throughout a volume of the sensor cable and along all three axes of the sensor cable, wherein the seismic sensors are assigned to sampling groups that are reconfigurable and not hardwired.

20 Claims, 5 Drawing Sheets

(56) References Cited

U.S. PATENT DOCUMENTS

| | | |
|---|---|---|
| 7,474,966 B2 | 1/2009 | Fernald et al. |
| 7,616,522 B2 | 11/2009 | Rouquette |
| 8,358,560 B2 | 1/2013 | Muyzert et al. |
| 8,553,490 B2 | 10/2013 | Hillesund et al. |
| 8,710,846 B2 | 4/2014 | Lindqvist et al. |
| 8,873,333 B2 | 10/2014 | Keers |
| 10,591,622 B2 * | 3/2020 | Hegge .................. G01V 1/201 |
| 2003/0198133 A1 | 10/2003 | Spackman et al. |
| 2006/0239117 A1 | 10/2006 | Singh et al. |
| 2007/0027638 A1 | 2/2007 | Fernald et al. |
| 2008/0049551 A1 | 2/2008 | Muyzert et al. |
| 2008/0225642 A1 | 9/2008 | Moore et al. |
| 2008/0285380 A1 | 11/2008 | Rouquette |
| 2008/0291779 A1 | 11/2008 | Muyzert et al. |
| 2009/0122641 A1 | 5/2009 | Hillesund et al. |
| 2010/0313659 A1 | 12/2010 | Berg et al. |
| 2011/0033079 A1 | 2/2011 | Liou et al. |
| 2011/0051551 A1 | 3/2011 | Tenghamn |
| 2011/0128817 A1 | 6/2011 | Keers |
| 2011/0158043 A1 | 6/2011 | Johnstad |
| 2011/0211423 A1 | 9/2011 | Muyzert et al. |
| 2011/0260730 A1 | 10/2011 | Sudow et al. |
| 2011/0292763 A1 | 12/2011 | Coates et al. |
| 2011/0310698 A1 | 12/2011 | Maples et al. |
| 2012/0163120 A1 | 6/2012 | Pearce |
| 2013/0009646 A1 | 1/2013 | Simon et al. |
| 2013/0300254 A1 | 11/2013 | Fujii et al. |
| 2014/0020939 A1 | 1/2014 | Nishio et al. |
| 2015/0117147 A1 * | 4/2015 | Hegge ..................... G01V 1/16 367/15 |

OTHER PUBLICATIONS

Examination Report for EP Application No. 14189796.7 dated Jan. 7, 2020.

Examination Report for EP Application No. 14189795.9 dated Dec. 20, 2019.

Examination Report for Malaysian Application No. PI2014703173 dated May 31, 2019.

European Search report dated Mar. 18, 2015, issued in the prosecution of European patent application 14189796.7, 6 pages.

European Search report dated Mar. 18, 2015, issued in the prosecution of European patent application 14189795.9, 6 pages.

Motonobu Kawai, "Fujifilm Unveils Bendable, Foldable, Roll-up Speakers," Tech-On!, Feb. 1, 2013, available at http://techon.nikkeibp.co.jp/english/NEWS_EN/20130201/263651/.

Bob Yirka, "Fugifilm Sshows of bendable 'Beat' diaphragm speker," Feb. 5, 2013, available at http://phys.org/news/2013-02-fujifilm-bendable-diaphragm-speaker.html.

Measurement Specialties, Inc., "Piezo Film Sensors: Technical Manual," Apr. 1999, pp. 1-86.

* cited by examiner

RECONFIGURABLE SEISMIC SENSOR CABLE

CROSS-REFERENCE TO RELATED APPLICATIONS

The present application is a continuation of U.S. patent application Ser. No. 14/339,283, filed Jul. 23, 2014, which claims the benefit of U.S. Provisional Application No. 61/897,510, filed Oct. 30, 2013, entitled "Reconfigurable Seismic Streamer," the entire disclosures of which are incorporated herein by reference.

BACKGROUND

Embodiments relate generally to seismic sensor cables (or simply "sensor cables") for marine geophysical surveys. More particularly, embodiments relate to a sensor cable that may be reconfigurable to have various combinations of seismic sensors.

Techniques for marine geophysical surveying include seismic surveying, in which geophysical data may be collected from below the Earth's surface. Seismic surveying has applications in mineral and energy exploration and production to help identify locations of hydrocarbon-bearing formations. Seismic surveying typically may be performed using sensor cables, such as "streamers" that may be towed through a body of water or "ocean bottom cables" that may be located on the water bottom. The sensors cables may include a plurality of seismic sensors, such as hydrophones, particle motion sensors, accelerometers, geophones, etc., disposed thereon at spaced apart locations along the length of each cable. In a typical seismic survey, one or more seismic sources may be actuated to generate, for example, seismic energy that travels downwardly through the water and into the subsurface rock. Seismic energy that interacts with interfaces, generally at the interfaces between layers of rock formations, may be reflected toward the surface and detected by the seismic sensors on the sensor cables. The seismic energy may be reflected when there is a difference in acoustic impedance between the layer above the interface and the layer below the interface. The detected energy may be used to infer certain properties of the subsurface rock, such as structure, mineral composition and fluid content, thereby providing information useful in the recovery of hydrocarbons.

Currently, a typical sensor cable may contain a limited quantity of seismic sensors (e.g., hydrophones, particle motion sensors, accelerometers, geophones, etc.) distributed evenly or variably along the length of the streamer. Seismic sensors such as hydrophones may be arranged in various configurations along the sensor cable. FIG. 1 illustrates an example sensor cable 10 that may comprise inline seismic sensors 12 disposed at spaced apart locations along a length of the sensor cable 10. The inline seismic sensors 12 may be arranged in what is generally known as a "group-forming" technique. As illustrated, the inline seismic sensors 12 may be arranged in sampling groups 14 in which the signals recorded by the inline seismic sensors 12 in each group may be combined or summed in various ways.

There may be drawbacks to the conventional group-forming technique. For instance, the sampling of locations assigned to the sampling groups 14 or the sampling of the individual inline seismic sensors 12 may be fixed. The inline seismic sensors 12 in the sampling groups 14 may be spaced at a fixed distance, typically at least about 60 cm. Moreover, the sampling distance is generally limited by the functionality of the hardware that connects the inline seismic sensors 12 in the sampling groups 14.

BRIEF DESCRIPTION OF THE DRAWINGS

These drawings illustrate certain aspects of some of the embodiments of the present invention and should not be used to limit or define the invention.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

Embodiments relate generally to seismic sensor cables (or simply "sensor cables"), such as streamers or ocean-bottom cables, for marine geophysical surveys. More particularly, embodiments relate to a sensor cable that may be reconfigurable to have various combinations of seismic sensors. One of the many potential advantages of the systems and methods of the present invention, only some of which are disclosed herein, is that the seismic sensors may be reconfigurable in various different ways, rather than hardwiring the seismic sensors into sampling groups. (See FIG. 5 for a more extensive discussion of reconfigurable sampling groups.) For example, in response to a failure of one or more seismic sensors, contributions of adjacent seismic sensors may be reweighted in compensation of the failure. By way of further example, the sampling distance after group forming may be changed without changing the hardware of the seismic sensors, particularly when using certain of the seismic sensors (e.g., film-based sensors). Additionally, several orders of directional derivatives along or orthogonal to the sensor cable (or in other directions) may be determined. As would be understood by one of ordinary skill in the art with the benefit of this disclosure, similar potential advantages exist when implementing reconfigurable seismic sensors with ocean bottom cables and streamers. Consequently, the discussion below should be read to include both reconfigurable seismic ocean bottom cables and reconfigurable seismic streamers.

Figure 2:
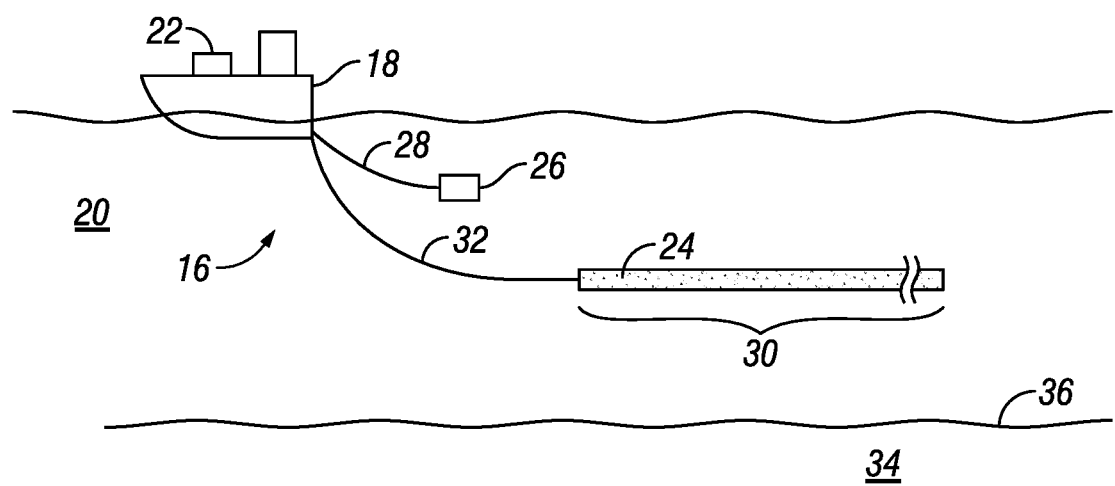
FIG. 2 shows an example embodiment of a marine geophysical survey system using a reconfigurable sensor cable.

Referring now to FIG. 2, a marine geophysical survey system 16 is illustrated in accordance with an example embodiment. In the illustrated embodiment, the marine geophysical survey system 16 may include a survey vessel 18 that moves along the surface of a body of water 20, such as a lake or ocean. The survey vessel 18 may include thereon equipment, shown generally at 22 and collectively referred to herein as a "recording system." The recording system 22 may include devices (none shown separately) for detecting and making a time indexed record of signals generated by each of seismic sensors 24 (explained further below) and for actuating a seismic source 26 at selected times. The recording system 22 may also include devices (none shown separately) for determining the geodetic position of the survey vessel 18 and the various seismic sensors 24.

As illustrated, the survey vessel 18 (or a different vessel) may tow the seismic source 26 in the body of water 20. A source cable 28 may couple the seismic source 26 to the survey vessel 18. The seismic source 26 may include any of a variety of different types of sources capable of imparting acoustic energy into the water, including, without limitation, a seismic air gun, a water gun, a vibrator, or an array of such devices, for example. At selected times, the seismic source 26 may be triggered, for example, by the recording system 22, to generate acoustic energy. It should be noted that, while the present example, shows only one seismic source 26, the invention is applicable to any number of seismic source 26 towed by the survey vessel 18 or any other vessel.

The survey vessel 18 may further tow a reconfigurable seismic streamer 30. The reconfigurable seismic streamer 30 may be coupled to the survey vessel 18 by way of a lead line 32. The reconfigurable seismic streamer 30 may be towed in a selected pattern in the body of water 20 by the survey vessel 18 or a different vessel. The configuration of the reconfigurable seismic streamers 30 on FIG. 2 is provided to illustrate an example embodiment and is not intended to limit the present invention. It should be noted that, while the present example, shows only one reconfigurable seismic streamer 30, the invention is applicable to any number of streamers, some or all of which may be reconfigurable seismic streamers, towed by the survey vessel 18 or any other vessel. For example, in some embodiments, more than one reconfigurable seismic streamer 30 may be towed by survey vessel 18 that may be spaced apart laterally, vertically, or both laterally and vertically. "Lateral" or "laterally," in the present context, means transverse to the direction of the motion of the survey vessel 18. Although not illustrated, marine geophysical survey system 16 may optionally include hardware for conducting electromagnetic surveying. In some embodiments, marine geophysical survey system 16 may include one or more ocean bottom cables, some or all of which may be reconfigurable ocean bottom cables.

The reconfigurable seismic streamer 30 may include seismic sensors 24 that generate signals, such as electrical or optical signals, in response to detecting seismic energy emitted from the seismic source 26 after the energy has interacted with the rock formations 34 below the water bottom 36. Signals generated by the seismic sensors 24 may be communicated to the recording system 22. In accordance with an embodiment of the invention, a geophysical data product may be produced. The geophysical data product may include processed geophysical data obtained from one or more of the seismic sensors and may be stored on a non-transitory, tangible computer-readable medium. The geophysical data product may be produced offshore (i.e. by equipment on a survey vessel) or onshore (i.e. at a facility on land) either within the United States or in another country. If the geophysical data product is produced offshore or in another country, it may be imported onshore to a facility in the United States. Once onshore in the United States, geophysical analysis, including further data processing, may be performed on the geophysical data product.

As illustrated, the seismic sensors 24 may be distributed throughout a volume of the reconfigurable seismic streamer 30, including over and around a surface of the reconfigurable seismic streamer 30. This may be an interior or exterior surface of the reconfigurable seismic streamer 30. By way of example, the surface of the reconfigurable seismic streamer 30 may be cylindrical or substantially cylindrical in shape. In some embodiments, the seismic sensors 24 may be distributed along all three axes of the reconfigurable seismic streamer 30. In some embodiments, the seismic sensors 24 may be distributed over a majority of the surface of the reconfigurable seismic streamer 30, up to and including substantially fully covering the surface of at least a portion of the reconfigurable seismic streamer 30. The reconfigurable seismic streamer 30 may include various distributions, arrangements, and configurations of the seismic sensors 24. The reconfigurable seismic streamer 30 may increase robustness of the marine geophysical survey system 16, reduce operating cost, and increase data accuracy.

The seismic sensors 24 may be distributed throughout the reconfigurable seismic streamer 30 in a closer spacing than previously used in seismic surveying wherein the sensors are spaced at regular (or semi-regular) locations. The term "spacing" with respect to the seismic sensors 24 refers to the direct distance through the volume of the reconfigurable seismic streamer 30 between any one of the seismic sensors 24 and the closest neighboring of the seismic sensors 24. For example, in contrast to conventional sensor spacing of about 60 centimeters, the seismic sensors 24 may have a spacing of about 50 centimeters or less. In particular embodiments, the seismic sensors 24 may have a spacing of about 10 centimeters or less and, alternatively, of about 5 centimeters or less.

In accordance with particular embodiments, the seismic sensors 24 may be distributed at a much greater density on the reconfigurable seismic streamer 30 by using specially designed sensors that enable distribution of the seismic sensors 24 throughout the volume of the reconfigurable seismic streamer 30. Examples of suitable seismic sensors 24 may include piezoelectric sensors. As will be discussed in more detailed below with respect to FIGS. 3-4, embodiments of the seismic sensors 24 may include film-based sensors (e.g., film-based sensor 38 on FIG. 3). Additional examples of suitable seismic sensors 24 may include microelectromechanical systems ("MEMS") sensors. Examples of suitable MEMS sensors are described in more detail in U.S. Pat. No. 8,650,963, the disclosure of which is incorporated herein by reference.

The reconfigurable seismic streamer 30 may be referred to as "reconfigurable" because the seismic sensors 24 may not be hardwired into sampling groups, but can rather be combined in many different ways to provide a multitude of different sampling groups. In some embodiments, one or more of the seismic sensor 24 may not be initially included in a sampling group, but can be included in subsequent processing, for example, to replace other of the seismic sensors 24 that may have malfunctioned during use of the reconfigurable seismic streamer 30. In one particular embodiment, the locations of the seismic sensors 24 within and/or on the reconfigurable seismic streamer 30 may be known. For example, the locations of the seismic sensors 24 may be known during the manufacturing process of the reconfigurable seismic streamer 30. As the location of the seismic sensors 24 are known, signals from the seismic sensors 24 may be combined in various other ways than simply hardwiring into sampling groups. In particular embodiments, signals from all of the seismic sensors 24 may be transmitted to the survey vessel 18 and then grouped as needed. Under certain operational considerations, data from one or more of the seismic sensors 24 in a particular sampling group may be excluded and replaced by reweighting contributions of others of the seismic sensors 24 in the particular sampling group. In some embodiments, the sampling groups may be reconfigured, for example, to account for local rotation. In some embodiments, a sampling group of the seismic sensors 24 may be enlarged, for example, if noise levels increase or to replaced failed ones of the seismic sensors 24. The sampling group may be enlarged, in some embodiments, by adding one or more of the seismic sensors 24 that were not in the initial sampling group. In the event that one or more of the seismic sensors 24 fail either during manufacturing of the reconfigurable seismic streamer 30 or during operation, the failed sensors may easily be compensated for by reweighting the contributions of the neighboring functioning sensors. In some embodiments, reweighting of sensor contributions may be based on amplitude, time, or both with regards to frequency content. This may allow a greater number of sensor failures in the sampling group before that particular group is considered bad. By way of example, two, five, ten, or even more of the seismic sensors 24 in a sampling group may fail but due to the large number of the seismic sensors 24 in each sampling group, the data from the failed sensors may be excluded as discussed above.

Assigning and/or re-assigning the seismic sensors 24 to different sampling groups may be accomplished using a computer system, which may perform this reconfiguring of sampling groups either dynamically during a geophysical survey or in subsequent processing of the obtained geophysical data. In some embodiments, the reconfiguring may occur between shots (i.e., sound bursts). The computer system may be a component of the recording system 22 on the survey vessel 18. Alternatively, the computer system may be located on a different vessel or onshore either within the United States or in another country, for example, where the reconfiguring of the sampling groups occurs in subsequent processing after completion of the geophysical survey.

Figure 1:
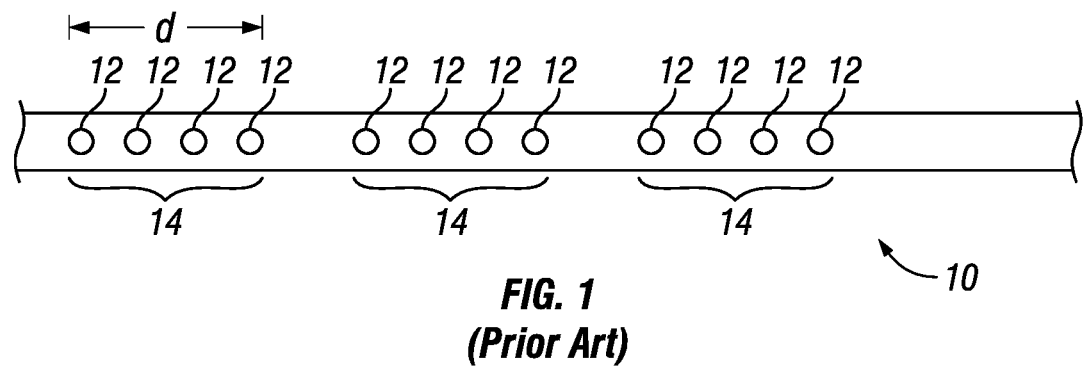
FIG. 1 shows a prior art sensor cable containing groups of inline seismic sensors disposed at spaced apart locations.

Moreover, the reconfigurable seismic streamer 30 may not be limited by hardware of the seismic sensors 24, particularly with film-based sensors, in the sampling distance of a sampling group of the seismic sensors 24. By way of example, in common implementations today, the sampling groups typically have a sampling distance of 12.5 meters. The sampling distance when used with reference to a sampling group typically refers to the distance between the two of the sensors 24 in the sampling group with the greatest spacing. An example sampling distance (d) is shown on FIG. 1. However, by use of the disclosed techniques, smaller sampling groups may be used, which may have lengths as small as 6.25 meters or even smaller. In addition, the lengths of the sampling groups may be regular or irregular.

Figure 3:
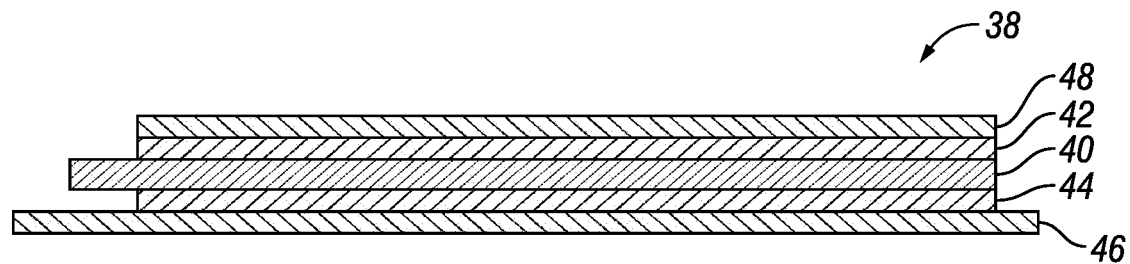
FIG. 3 shows an example embodiment of a film-based sensor.

FIG. 3 illustrates a side, cross-sectional view of an example of a film-based sensor 38 that may be used in accordance with present embodiments. In particular, the film-based sensor 38 may be used as one or more of the seismic sensors 24 shown on FIG. 2. The film-based sensor 38 may be flexible and/or bendable. In particular embodiments, the film-based sensor 38 may be in the form of a sensor strip that can be woven together with one or more additional film-based sensors 38 along a streamer (e.g., reconfigurable seismic streamer 30 on FIG. 2).

As illustrated, the film-based sensor 38 may include a film 40. The film-based sensor 38 may further comprise a pair of conductive layers, e.g., upper conductive layer 42 and lower conductive layer 44, on opposing sides of the film 40. The upper conductive layer 42 and lower conductive layer 44 may function as electrodes in the film-based sensor 38. The film 40, upper conductive layer 42, and lower conductive layer 44 may be coated on a protective sheet 46 with a protective coating 48 disposed on the upper conductive layer 42. The configuration of the film-based sensor 38 shown on FIG. 3 is merely illustrative and use of alternative configurations for the film-based sensor 38 is within the scope of the present disclosure.

In some embodiments, the film 40 may comprise a piezoelectric ceramic. Non-limiting examples of suitable piezoelectric ceramics include barium titanate, lead zirconate, lead titanate, and combinations thereof. In accordance with present embodiments, the film 40 may further comprise a viscoelastic polymer. By way of example, the film 40 may comprise a mixture of the piezoelectric ceramic and the viscoelastic polymer. In one particular embodiment, the viscoelastic polymer may have a compressibility that may be dependent upon a voltage of the viscoelastic polymer. For example, the viscoelastic polymer may harden in a certain frequency range and soften in an alternate frequency. In this manner, the viscoelastic polymer may be used to form a film 40 that is sufficiently hard to function as a sensor for seismic surveying without undesired sound absorption while also being soft enough to be pliable.

In some embodiments, the upper conductive layer 42 and the lower conductive layer 44 may include a variety of different conducive materials. Without limitation, suitable conductive materials may include metals, such as gold, platinum, silver, iridium, aluminum, molybdenum, ruthenium, titanium titride, iridium oxide, ruthenium oxide, lanthanum nickel oxide, metal oxides of these metals, and combinations thereof. The upper conductive layer 42 and the lower conductive layer 44 may be the same conductive material or a different conductive material.

As illustrated, the film-based sensor 38 may further comprise a protective sheet 46 and a protective coating 48. The protective sheet 46 and protective coating 48 may be made from a number of different materials, including, without limitation, polymers such as a polyester (e.g., Mylar® polyester film), non-poled polyvinylidene fluoride, polyimide (e.g., Kapton® polyimide film), polycarbonate, high-density polyethylene, or combinations thereof. The protective sheet 46 and the protective coating 48 may be the same or different protective material.

Figure 4:
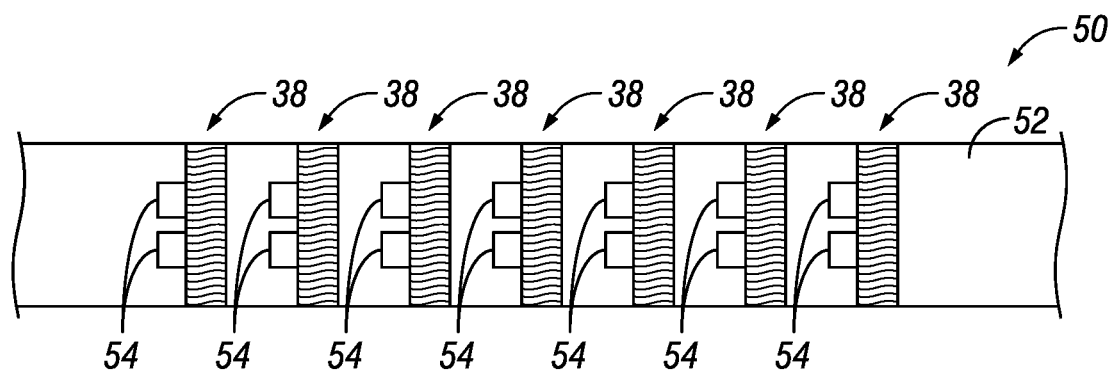
FIG. 4 shows an example embodiment of a sensor strip of film-based sensors.

FIG. 4 illustrates a top view of a sensor strip 50 that comprises a plurality of the film-based sensors 38 in accordance with present embodiments. As illustrated, the sensor strip 50 comprises a flexible substrate 52 and the film-based sensors 38. The film-based sensors 38 may be spaced regularly or irregularly on the flexible substrate 52. In particular embodiments, the sensor strip 50 may be wrapped or weaved throughout a streamer (e.g., reconfigurable seismic streamer 30). By way of example, the sensor strip 50 could be positioned so that the film-based sensors 38 may be positioned along all three axes of the reconfigurable seismic streamer 30 (see, e.g., seismic sensors 24 on FIG. 11). Each of the film-based sensors 38 may comprise a pair of electrical connections 54 for coupling the upper conductive layer 42 and the lower conductive layer 44 (e.g., see FIG. 3) to wires (not shown) or other suitable mechanism for signal transmission. The configuration of the sensor strip 50 shown on FIG. 4 is merely illustrative and use of alternative configurations for the sensor strip 50 is within the scope of the present disclosure.

Figure 5:
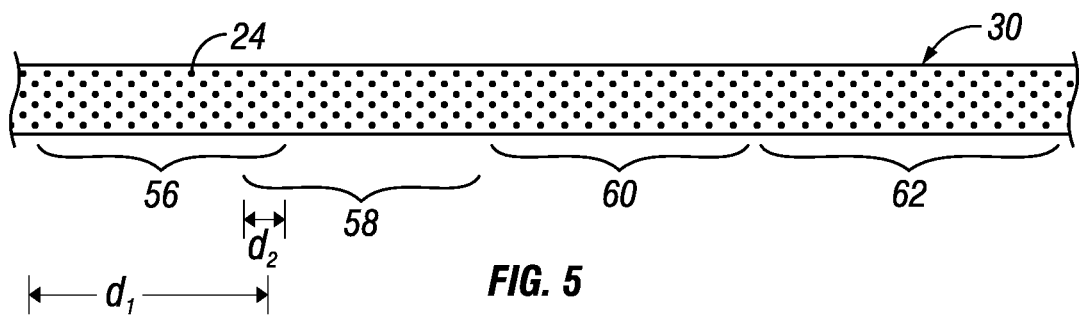
FIG. 5 shows an example reconfigurable sensor cable that comprises a plurality of seismic sensors distributed throughout a volume of the sensor cable.

FIG. 5 is another view of the reconfigurable seismic streamer 30 of FIG. 2 in accordance with present embodiments. As illustrated, the reconfigurable seismic streamer 30 comprises a plurality of seismic sensors 24 distributed throughout a volume of the reconfigurable seismic streamer 30. In particular embodiments, the seismic sensors 24 may comprise piezoelectric sensors, such as the film-based sensor 38 shown on FIG. 3, or MEMS sensors. In some embodiments, the seismic sensors 24 may be configured in one or more strips of sensors (e.g., sensor strip 50 on FIG. 4) or otherwise woven together to form one or more interconnected groups of sensors.

In accordance with present embodiments, the seismic sensors 24 of the reconfigurable seismic streamer 30 may be assigned to one or more sampling groups 56, 58, 60, 62. In the illustrated embodiment, four sampling groups 56, 58, 60, 62 are shown but the seismic sensors 24 may be assigned to more or less than four sampling groups as desired for a particular application. The sampling groups 56, 58, 60, 62 may be referred to as first sampling group 56, second sampling group 58, third sampling group 60, and fourth sampling group 62. The signals of the seismic sensors 24 in each sampling group may be summed or otherwise combined for data processing. Signal combination may occur before or after digitizing of the signal. As illustrated by FIG. 5, the group spacing may overlap in some embodiments. For example, one or more of the seismic sensors 24 in a particular sampling group may also be assigned partially to the immediately preceding group or immediately following group. To partially assign, particular one of the seismic sensors 24 to more than one of the sampling groups 56, 58, 60, 62, for example, the signal may be duplicated, weighted (such that the total weight is still 1), and then distributed over adjacent sampling groups. In some embodiments, the contribution of the overlapping sensors in each group may be weighted in each group based on the distance to the center of the particular group. In the illustrated embodiment, the first group 56 and the second group 58 contain overlapping sensors. For example, a portion of the seismic sensors 24 assigned to the first group 56 may also be assigned to the second group 58, and a portion of the seismic sensors 24 assigned to the second group 58 may also be assigned to the first group 56. While only the first group 56 and the second group 58 are shown with overlapping sensors, other of the seismic sensors 24 may be assigned to overlapping groups in accordance with present embodiments.

In some embodiments, the group spacing ($d_1$) and/or group overlap ($d_2$) may vary based on a particular criteria. For example, the group spacing ($d_1$) may be varied based on expected signal-to-noise ratio. Signals of interest may be lower in amplitude in deeper water due to their later arrivals and due to practical or environmental limits imposed on source strengths, for example. Accordingly, it may be beneficial to have an increased group spacing ($d_1$) in particular embodiments. For example, the group spacing may be increased to 15 meters or even longer (18.75 m) from the standard group spacing of 12.5 meters. In other embodiments, the seismic sensors 24 may be assigned to sampling groups in subsequent processing that have a group spacing ($d_1$) that is a factor (e.g., x/2, x/3, x/6, x/8, x/10, etc.) of the shot spacing.

In some embodiments, the sampling groups 56, 58, 60, 62 may be reconfigured, for example, to account for streamer stretch. By way of example, the centers of the sampling groups 56, 58, 60, 62 may be redefined during data acquisition based on actual distance along the reconfigurable seismic streamer 30 instead of adapting their offsets accordingly. By way of example, if the seismic sensors 24 are distributed linearly along the reconfigurable seismic streamer 30 and the fourth sampling group 62 is displaced 10 meters further along due to stretch, then some seismic sensors 24 could be removed from the fourth sampling group 62 and other of the seismic sensors 24 could be added to the fourth sampling group 62 based on their actual distance along the reconfigurable seismic streamer 30 in relation to the group center.

Figure 6:
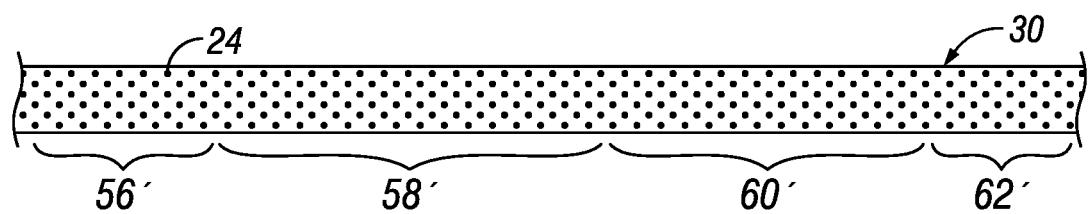
FIG. 6 shows an example reconfigurable sensor cable that comprises a plurality of seismic sensors distributed throughout a volume of the sensor cable.
Figure 7:
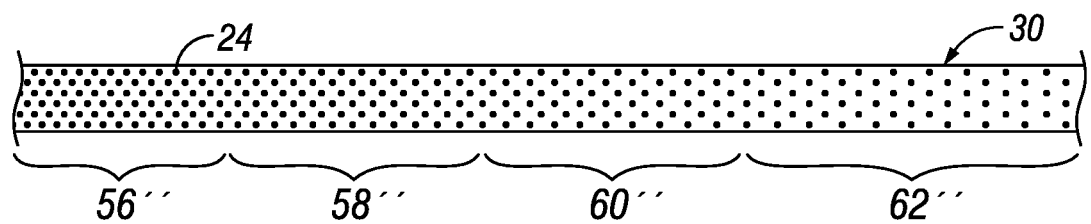
FIG. 7 shows an example reconfigurable sensor cable that comprises a plurality of seismic sensors distributed throughout a volume of the sensor cable.

FIGS. 6 and 7 show alternative embodiments of the reconfigurable seismic streamer 30 with different sampling group configurations. As illustrated by FIG. 6, the sampling groups 56', 58', 60', 62' may have an irregular spacing in some embodiments. As illustrated by FIG. 7, the seismic sensors 24 may become less dense from the front of the reconfigurable seismic streamer 30 its end such that the number of the seismic sensors 24 in each of the sampling groups 56", 58", 60", 62" varies.

Figure 8:
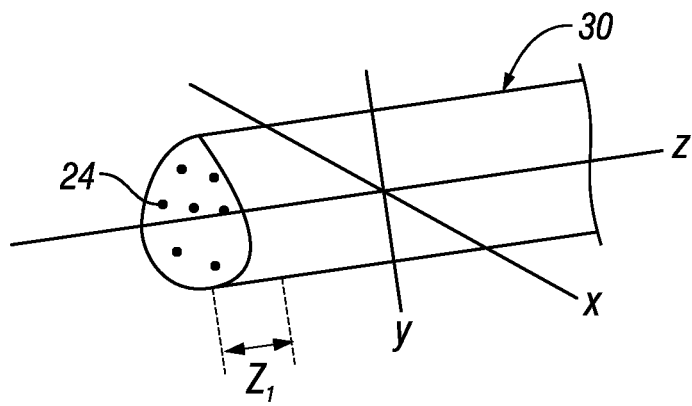
FIG. 8 is a three-dimensional view of the reconfigurable sensor cable of FIG. 5.
Figure 9:
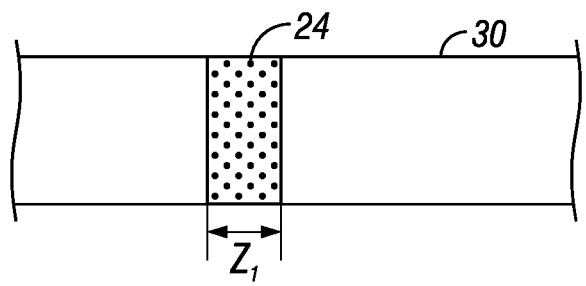
FIG. 9 is a side view of a slice of the reconfigurable sensor cable of FIG. 5.

FIG. 8 is a three-dimensional view of the reconfigurable seismic streamer 30 of FIG. 5 illustrating the seismic sensors 24 distributed throughout a volume thereof in accordance with present embodiments. The x-, y-, and z-axes of the reconfigurable seismic streamer 30 are shown on FIG. 8. As illustrated, the seismic sensors 24 may be distributed in the volume of the reconfigurable seismic streamer 30 on the x-axis and the y-axis. The seismic sensors 24 shown on FIG. 8 may be distributed along the z-axis of the reconfigurable seismic streamer 30 a depth of $Z_1$. With additional reference to FIG. 9, the seismic sensors 24 may also be distributed on the z-axis of the reconfigurable seismic streamer 30.

Figure 10:
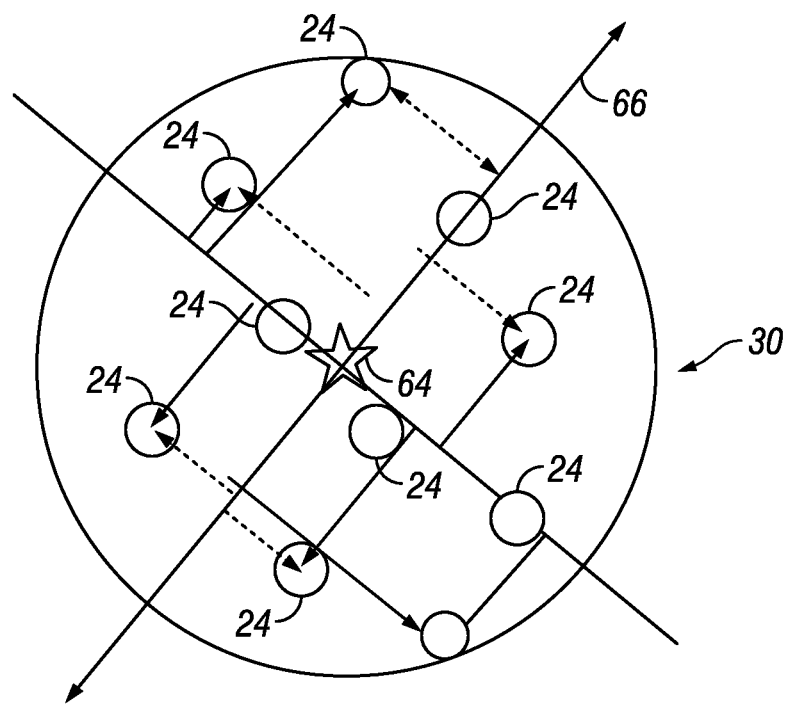
FIG. 10 is a cross-sectional view of the reconfigurable sensor cable of FIG. 5.

FIG. 10 is a cross-sectional view of the reconfigurable seismic streamer 30 of FIG. 5, in accordance with present embodiments, having seismic sensors 24 distributed throughout a volume thereof. As illustrated, one or more of the seismic sensors 24 may be on the surface of the reconfigurable seismic streamer 30. The seismic sensors 24 shown on FIG. 10 may not necessarily be in the slice itself but could be distributed in the reconfigurable seismic streamer 30 at different z-positions. In the illustrated embodiment, the center of the reconfigurable seismic streamer 30 is represented by reference number 64. As indicated in FIG. 10, directional derivatives may be determined from finite difference calculations by using weights based on projected distances along and perpendicular to a particular direction, indicated by arrow 66. Based on finite difference calculation, the directional derivatives in all three axes may be determined by using, for example, contributions from the seismic sensors 24 located around the cylindrical surface of the reconfigurable seismic streamer 30 and their perpendicular distance to the cross-section shown. Accordingly, several orders of directional derivatives along or orthogonal (or in other directions) to the reconfigurable seismic streamer 30 may be determined. The directional derivatives may be determined even if at least some of the seismic sensors 24 are not necessarily located in line with a certain direction of the derivatives.

Figure 11:
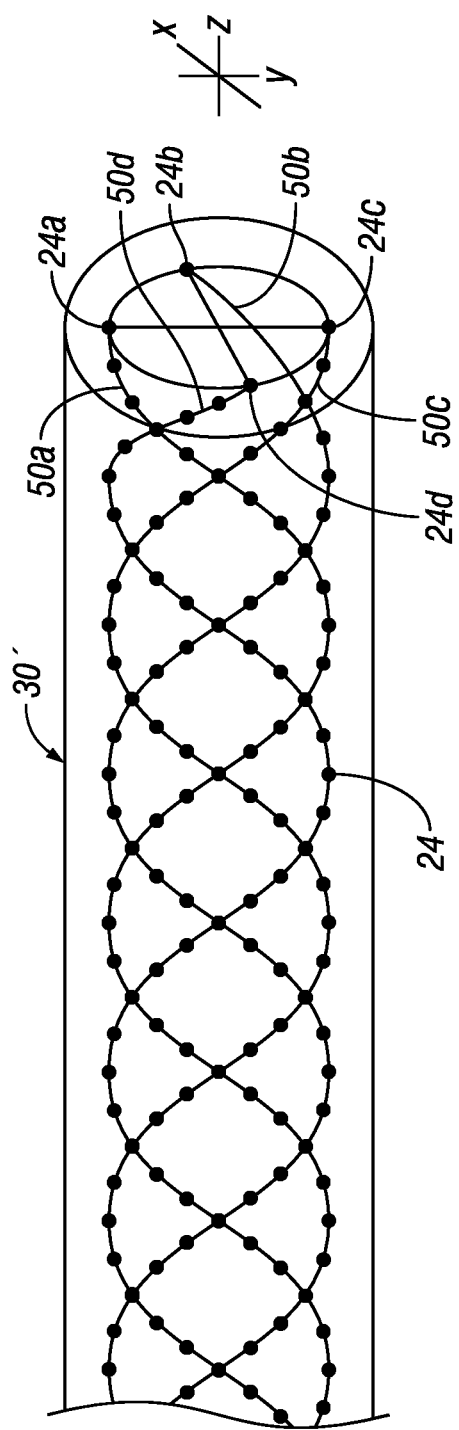
FIG. 11 shows an example reconfigurable sensor cable that comprises four sensor strips distributed throughout a volume of the reconfigurable sensor cable in a helical pattern.

FIG. 11 is a view of a reconfigurable seismic streamer 30' illustrating one embodiment for distribution of the seismic sensors 24 throughout a volume thereof. In particular embodiments, the seismic sensors 24 may comprise piezoelectric sensors, such as the film-based sensor 38 shown on FIG. 3. The reconfigurable seismic streamer 30' may be used in seismic surveying, such as in the marine geophysical survey system 16 illustrated on FIG. 2.

As illustrated, the reconfigurable seismic streamer 30' may include a plurality of seismic sensors 24 distributed throughout the volume and along all three axes of the reconfigurable seismic streamer 30'. In the illustrated embodiment, the seismic sensors 24 are distributed along the reconfigurable seismic streamer 30' in helical patterns. In particular embodiments, four different sensor strips 50a-50d containing the seismic sensors 24 are distributed in helical patterns along and about the longitudinal (or z-axis) of the reconfigurable seismic streamer 30'. The seismic sensors 24 in each of the sensor strips 50a-50d may be woven together or otherwise coupled so that each of the sensor strips 50a-50d forms an interconnected strip of the seismic sensors 24. An example of such an interconnected strip is the sensor strip 50 shown on FIG. 4 on which the seismic sensors 24 comprise film-based sensors 38. As illustrated, the sensor strips 50a-50d may be arranged so that at least two of the seismic sensors 24 are diametrically opposed and there are at least four of the seismic sensors 24 in a cross-section. For example, seismic sensors 24a and 24c may be diametrically opposed to one another while seismic sensors 24a-24d may each be in the same cross-section. In this arrangement, the seismic sensors 24 on the sensor strips 50a-50d may each be spaced on the corresponding sensor strips 50a-50d at common intervals to provide two of the seismic sensors 24 that are diametrically opposed to one another with four of the seismic sensors in a cross-section.

Figure 12:
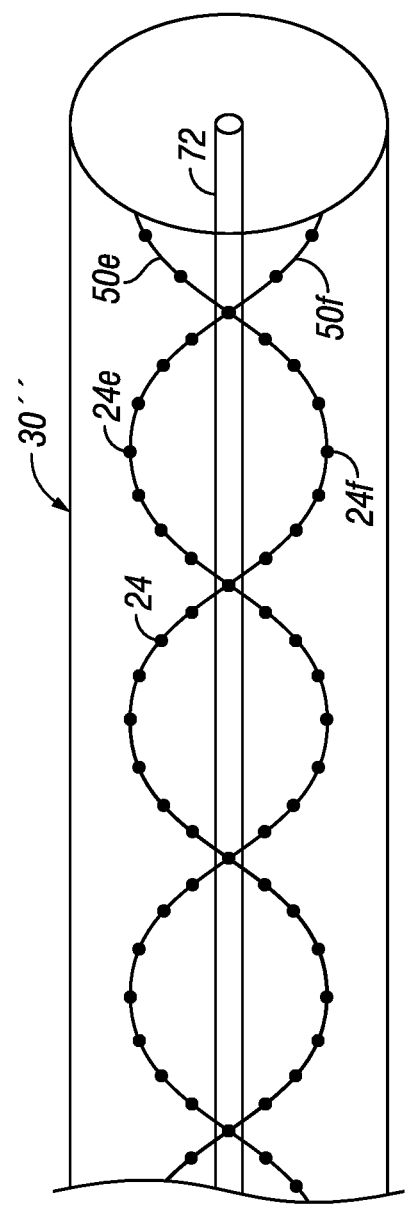
FIG. 12 shows an example reconfigurable sensor cable that comprises two sensor strips distributed around the core of the reconfigurable sensor cable.

FIG. 12 is another view of a reconfigurable seismic streamer 30" illustrating one embodiment for distribution of the seismic sensors 24 throughout a volume thereof. In particular embodiments, the seismic sensors 24 may comprise piezoelectric sensors, such as the film-based sensor 38 shown on FIG. 3. The reconfigurable seismic streamer 30" may be used in seismic surveying, such as in the marine geophysical survey system 16 illustrated on FIG. 2. As illustrated, the seismic sensors 24 may be distributed over and around a surface of the reconfigurable seismic streamer 30", which may be an interior or exterior surface. In the illustrated embodiment, the seismic sensors 24 may be distributed over and around a core 72 of the reconfigurable seismic streamer 30". In the illustrated embodiment, two sensors strips 50e and 50f comprising the seismic sensors 24 are shown weaving over and around the core 72. The seismic sensors 24 in each of the sensor strips 50e and 50f may be woven to together or otherwise coupled so that each of the sensor strips 50e and 50f forms an interconnected strip of the seismic sensors 24. An example of such an interconnected strip is the sensor strip 50 shown on FIG. 4 on which the seismic sensors 24 comprise film-based sensors 38. Similar to the embodiment illustrated on FIG. 11, the sensor strips 50e and 50f shown on FIG. 12 may also be arranged so that the two of the seismic sensors 24 are diametrically opposed to one another. For example, seismic sensors 24e and 24f may be diametrically opposed to one another as illustrated on FIG. 11.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless states otherwise. The above description is intended to cover such alternatives, modifications, and equivalents as would be apparent to a person skilled in the art having the benefit of this disclosure.

The scope of the present disclosure includes and feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A seismic streamer for marine geophysical surveying comprising:
   a sensor cable; and
   a sensor strip that extends along the sensor cable, wherein the sensor strip comprises a flexible substrate and seismic sensors spaced apart from one another on the flexible substrate, wherein the seismic sensors are not hardwired into sampling groups.

2. The seismic streamer of claim 1, wherein the seismic sensors are spaced regularly on the sensor strip.

3. The seismic streamer of claim 1, wherein the seismic sensors are spaced irregularly on the sensor strip.

4. The seismic streamer of claim 1, wherein the sensor strip is arranged in the sensor cable to provide the seismic sensors along all three axes of the sensor cable.

5. The seismic streamer of claim 1, wherein the sensor strip is arranged in the sensor cable in a helical pattern.

6. The seismic streamer of claim 1, further comprising one or more additional sensor strips that extend along the sensor cable, wherein each sensor strip of the one or more additional sensor strips comprises a flexible substrate and seismic sensors spaced apart from one another on the flexible substrate.

7. The seismic streamer of claim 6, wherein at least a portion of the seismic sensors of the sensor strip and the one or more additional sensor strips are distributed throughout a volume of the sensor cable at a spacing of about 50 centimeters or less.

8. The seismic streamer of claim 1, further comprising three additional sensor strips, wherein each sensor strip of the three additional sensor strips comprises an additional flexible substrate and additional seismic sensors spaced apart from one another on the additional flexible substrate.

9. The seismic streamer of claim 8, wherein the sensor strip and the three additional sensor strips are arranged so a cross-section of the sensor cable has at least two diametrically opposed sensors from the sensor strip and/or the three additional sensor strips, and wherein at least four sensors from the sensor strip and/or the three additional sensor strips are in the cross-section of the sensor cable.

10. The seismic streamer of claim 8, wherein the sensor strip and the three additional sensor strips are distributed along the sensor cable in helical patterns.

11. The seismic streamer of claim 1, where the sensor strip is arranged around a core of the sensor cable as the sensor strip extends along the sensor cable.

12. The seismic streamer of claim 11, further comprising one or more additional sensor strips, wherein each sensor strip of the one or more additional sensor strips comprises a flexible substrate and seismic sensors spaced in the flexible substrate, wherein each sensor strip of the one or more additional sensors strips is arranged around a core of the sensor cable as each sensor strip extends along the sensor cable.

13. The seismic streamer of claim 1, wherein at least one of the seismic sensors comprises at least one sensor selected from the group consisting of a microelectromechanical sensor, a piezoelectric sensor, and any combination thereof.

14. The seismic streamer of claim 1, wherein at least one of the seismic sensors comprises a film, the film comprising a viscoelastic polymer and a piezoelectric ceramic.

15. The seismic streamer of claim 1, wherein a density of the seismic sensors decreases from a front of the sensor cable to a rear of the sensor cable.

16. A system for marine geophysical surveying comprising:
a sensor streamer comprising a sensor cable and a sensor strip that extends along the sensor streamer in a helical pattern, wherein the sensor strip comprises a flexible substrate and seismic sensors spaced apart from one another on the flexible substrate, wherein at least one of the seismic sensors comprises a film, the film comprising a viscoelastic polymer and a piezoelectric ceramic; and
a computer system configured to receive geophysical data from the seismic sensors and assign the seismic sensors to overlapping sampling groups, wherein the seismic sensors are not hardwired into the sampling groups.

17. The system of claim 16, further comprising one or more additional sensor strips that extend along the sensor cable, wherein each sensor strip of the one or more additional sensor strips comprises a flexible substrate and seismic sensors spaced in the flexible substrate.

18. The system of claim 17, wherein the one or more additional sensor strips are arranged in the sensor cable in a helical patter.

19. A system for marine geophysical surveying comprising:
a seismic streamer for marine geophysical surveying comprising a sensor cable and a sensor strip that extends along the sensor cable, wherein the sensor strip comprises a flexible substrate and seismic sensors spaced apart from one another on the flexible substrate, wherein the seismic sensors are not hardwired into sampling groups; and
a lead line coupled to the seismic streamer for coupling the seismic streamer to a survey vessel.

20. The system of claim 19, further comprising one or more additional sensor strips that extend along the sensor cable, wherein each sensor strip of the one or more additional sensor strips comprises a flexible substrate and seismic sensors spaced in the flexible substrate.

* * * * *